(12) United States Patent
Gertitschke et al.

(10) Patent No.: US 7,253,378 B2
(45) Date of Patent: Aug. 7, 2007

(54) HEAT LAMINATING A COVER FOIL TO A BASE FOIL

(75) Inventors: Detlev Gertitschke, Laupheim (DE); Bernd Zoller, Laupheim (DE); Jörg Knüppel, Schwendi (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 112 days.

(21) Appl. No.: 11/218,989

(22) Filed: Sep. 2, 2005

(65) Prior Publication Data
US 2006/0049173 A1    Mar. 9, 2006

(30) Foreign Application Priority Data
Sep. 6, 2004    (DE) ...................... 10 2004 043 450

(51) Int. Cl.
*B21B 27/06*    (2006.01)
*G03G 15/20*    (2006.01)

(52) U.S. Cl. ...................... 219/469; 219/470; 219/528; 219/216; 399/328; 399/338; 399/285; 118/60; 432/60; 432/228

(58) Field of Classification Search ................ 219/216, 219/469, 528, 470; 399/328–338, 69, 285–286; 118/60; 432/60, 228; 492/46; 430/350, 430/353; 347/154
See application file for complete search history.

(56) References Cited

FOREIGN PATENT DOCUMENTS

DE    198 50 143    5/2000

*Primary Examiner*—Shawntina Fuqua
(74) *Attorney, Agent, or Firm*—Andrew Wilford

(57) ABSTRACT

A base sheet is spanned over a lower roller, and an upper roller pulls a cover sheet along a path and presses it against the base sheet at the lower roller. A preheater housing along the path upstream of the rollers is formed with a chamber open toward the path. A radiant heater in the chamber is directed transversely at the path so as to heat the cover sheet passing along the path. A sensor along the path adjacent the chamber detects atmosphere around the chamber and generates an output when the detected atmosphere indicates an unsafe hot condition of the cover sheet. A shutter can shift between a retracted position offset from the chamber and an advanced position closing the chamber. A controller connected to the sensor shifts the shutter from the retracted position to the advanced position when the output is generated by the sensor.

18 Claims, 3 Drawing Sheets

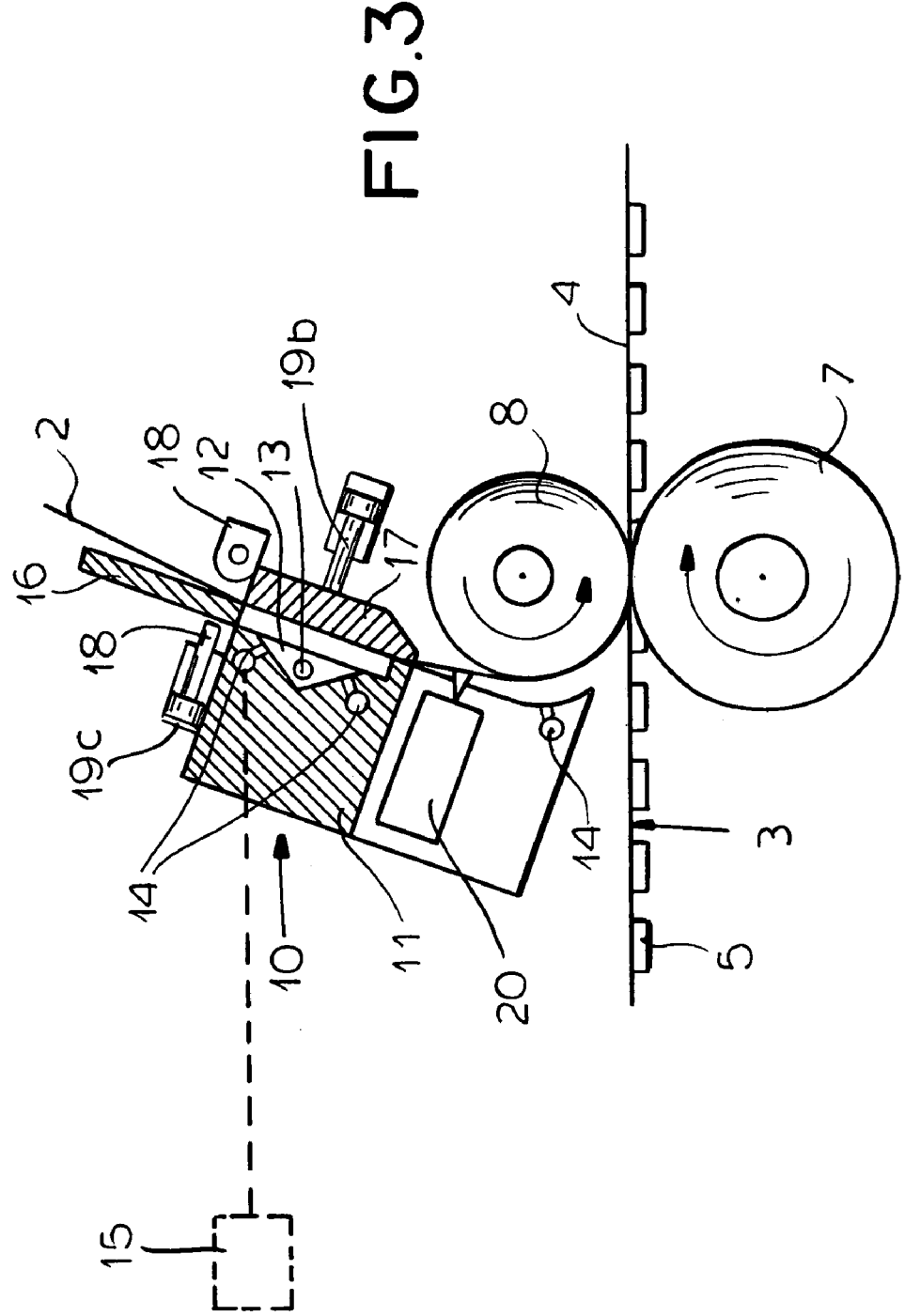

HEAT LAMINATING A COVER FOIL TO A BASE FOIL

FIELD OF THE INVENTION

The present invention relates to a system for heat laminating a cover foil to a base foil. More particularly this invention concerns a system for heating a cover foil so that it can be pressed against and adhered to a base foil formed with an array of product-containing pockets or blisters.

BACKGROUND OF THE INVENTION

In the mass production of bubble or blister packs, it is standard to form a base sheet or foil with an array of pockets or blisters, then to advance this foil with the pockets open upward so they can be filled with the product to be packaged. Then a cover foil is applied to the upwardly directed upper face of the filled base foil and is adhered to it in the webs between adjacent pockets. The cover foil can be made to adhere by heating it or a face of it so that a good bond is formed and the product is hermetically encased in the now closed products. Then the laminated-together foils are cut apart in the webs between the pockets to form individual packages.

U.S. Pat. No. 5,608,277 of Scheifele describes a system where the cover foil is heated by passing it between a pair of heater plates. During normal operation the heater plates are closely juxtaposed with the cover foil which is oriented in a vertical plane. If the system is shut down temporarily or not in use, the two heater plates are shifted back away from the cover foil so that they do not overheat and, possibly, burn it. Such heater plates work well during the production run, but getting them up to the desired temperature and accurately controlling their temperatures is a problem, so that at the start of the run a certain amount of the cover foil is inadequately heated and does not adhere to the base foil, creating unusable packages, and during the run it is not possible to precisely adjust the temperature of the cover foil.

In German 198 50 143 of Bar a near infrared (NIR) emitter, e.g. with a wavelength of 1.4 µm, is used to heat the cover foil. Such a heater has two emitter tubes each having a tungsten filament that is heated electrically. The power supplied to the filaments is regulated to control the temperature to which the cover foil is heated, this temperature being of course also dependent on the spacing of the foil from the heater, the composition of the foil, and the speed at which the foil moves past the heater.

The problem with this system is that the cover foil is typically fairly fragile and also flammable. If the foil stops, it can quickly be melted through or set afire, and the same thing can happen simply if the foil conveyor jams or the foil breaks. The existing systems therefore present a fire hazard and also often require that the surroundings be somehow protected from the occasional accident.

OBJECTS OF THE INVENTION

It is therefore an object of the present invention to provide an improved system for heat laminating a cover foil to a base foil.

Another object is the provision of such an improved system for heat laminating a cover foil to a base foil that overcomes the above-given disadvantages, in particular that is capable of reacting if the foil feed stops, the foil breaks, or something else happens that could create a fire or other hazard.

SUMMARY OF THE INVENTION

An apparatus for sealing a cover sheet to a base sheet has according to the invention a lower roller over which the base sheet is spanned for advancing the base sheet, an upper roller for pulling the cover sheet along a path and pressing it against the base sheet at the lower roller, and a preheater housing along the path upstream of the rollers formed with a chamber open toward the path and the cover sheet extending along the path. A radiant heater in the chamber is directed therefrom transversely at the path so that the heater heats the cover sheet passing along the path. A sensor along the path adjacent the chamber detects atmosphere in and around the chamber and generates an output when the detected atmosphere indicates an unsafe hot condition of the cover sheet. A shutter can shift between a retracted position offset from the chamber and an advanced position closing the chamber. A controller connected to the sensor shifts the shutter from the retracted position to the advanced position when the output is generated by the sensor.

As the cover sheet is heated, gases are driven out of it and it is possible to detect these gases to determine if a dangerous condition exists. It can also determine if the sheet is not being heated enough so that, for example, the voltage to the heater can be increased. The system will therefore automatically adjust for variation in the sheet-advance speed within a fairly wide range. Normally only the coated side of the cover sheet, that is the side that is to be pressed against the base sheet, need be heated. It is not necessary to heat the cover sheet through.

The heater according to the invention is electromagnetic, more specifically an NIR heater. Such a heater is easy to control simply by varying the voltage of its electrical feed.

In accordance with the invention the shutter lies between the housing and the path. It is a plate, and it moves parallel to the path between its positions. Thus in the event of an overly hot condition, the chamber can be closed, as with a door, to completely contain the heat and shield the cover sheet. The chamber can also be closed when the apparatus is being loaded, that is when a cover sheet is being threaded through the preheater, to prevent accidents and contact with the NIR heater. The shutter is automatically closed whenever the sheet advance is stopped.

According to the invention a reflector is spaced transversely of the path from the housing at the chamber. The path extends between the reflector and the housing. An actuator is provided for displacing the reflector transversely of the path between an outer position spaced from the housing and from the cover sheet on the path and an inner position against the housing and closing the chamber. This reflector functions like the shutter and is a redundant or alternate safety device. Its movement perpendicular to the sheet path means it can be brought into the inner position very quickly, for instance by a pneumatic actuator. This reflector is cooled so that, when it is closed, it quickly cools down the preheater.

The housing and path in accordance with the invention form an acute angle with vertical. The chamber is directed downward from the horizontal toward the cover sheet. This angle is between 15° and 45°. In this manner if the cover sheet breaks, it will not drop or fall into the heater, but instead will fall away from it.

Furthermore according to the invention means is provided upstream along the path from the chamber for gripping the cover sheet. Thus if the cover sheet breaks, it can be held so that it does not pull out of the preheater, as breakage is typically downstream of the preheater where the cover sheet is pressed to the base sheet.

The housing according to the invention is formed adjacent the chamber with intake passages connected to the sensor means. A fan or subatmospheric-pressure source is provided for drawing air in through the passages and feeding it to the sensor means. Thus the sensor is offset from the heater and is protected from its high heat.

According to the invention a pyrometer is mounted downstream along the path from the chamber, and a controller is connected to the pyrometer, to the sensor means, and to the radiant heater for controlling the temperature of the heater, typically be varying the voltage feed for the heater. Thus there are redundant sensors—the atmosphere sensor adjacent the chamber and the pyrometer downstream of the heater—and redundant chamber-closing systems—the shutter and the reflector, all connected to the controller so that under any circumstances the system is protected.

In according to with the invention, means is provided for cooling the housing, also for cooling the lower roller. Further means is provided for heating the upper roller. Keeping the preheater housing cool makes working around it safe. Cooling the lower roller ensures that, when the hot cover sheet is applied to it, bonding will be quick and sure.

BRIEF DESCRIPTION OF THE DRAWING

The above and other objects, features, and advantages will become more readily apparent from the following description, reference being made to the accompanying drawing in which:

FIG. 3 is a view like FIG. 1 in an alternate safe position.

SPECIFIC DESCRIPTION

Figure 2:
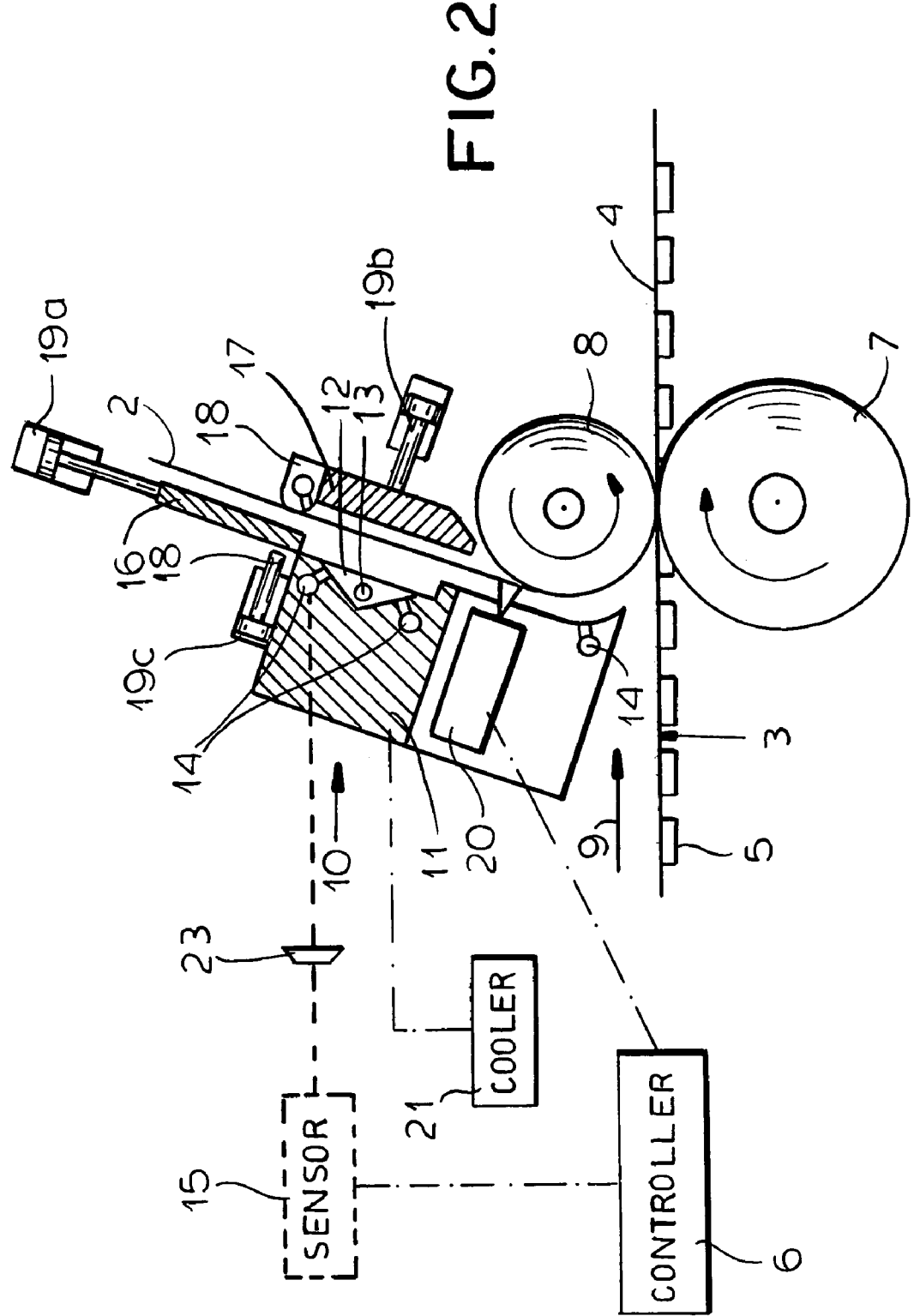
FIG. 2 is a view like FIG. 1 but showing the system during a normal laminating operation.

As seen in FIG. 2 a laminating apparatus 1 works with a cover foil 2 and a base foil 3, the latter having an array of pockets or blisters 5 separated by coplanar webs 4. Typically the pockets 5, which are upwardly open in the apparatus 1, are filled with a product. The base foil 3 is advanced in a horizontal transport direction 9 by a cooled feed or support roller 7 formed with recesses complementary to the pockets 5. The foil 2 is pressed down against the top surface of the foil 3 on the feed roller 7 by an upper heated roller 8 so as to adhere the foils 2 and 3 together at the webs 4. This is all generally standard.

According to the invention a preheater 10 is provided for the foil 2 upstream of the rollers 7 and 8. It has a housing 11 formed with a compartment or chamber open toward the foil 2 and provided with radiant heater here constituted as an NIR emitter 13 that is electrically energized through a controller 6 to direct NIR radiation against the face of the foil 2 that is pressed by the roller 7 against the upper face of the foil 3. Here the foil 2 is fed through the preheater 10 at an angle of about 30° to the vertical, and the chamber 12 is oriented so that it is parallel to and directed slightly downward at the foil 2. In this manner if the foil 2 breaks or melts, it will fall away from the emitter 13, not toward it. A cooler 21 is provided to keep the housing 11 at or below a predetermined safe temperature. The preheater 10 serves to soften at least one face of the foil 2 or a surface layer thereon so that, when the foils 2 and 3 are pressed together, they bond.

Upstream and downstream of the emitter 13 are vent passages 14 connected through a suction fan 23 to a sensor 15 in turn connected to the controller 6 and serving to detect when the atmosphere adjacent the foil 2 indicates that it is too hot or on fire. In addition downstream of the emitter 13 is a pyrometer 20 also connected to the controller 6 that can optically detect if the foil 2 is too hot or on fire.

Figure 1:
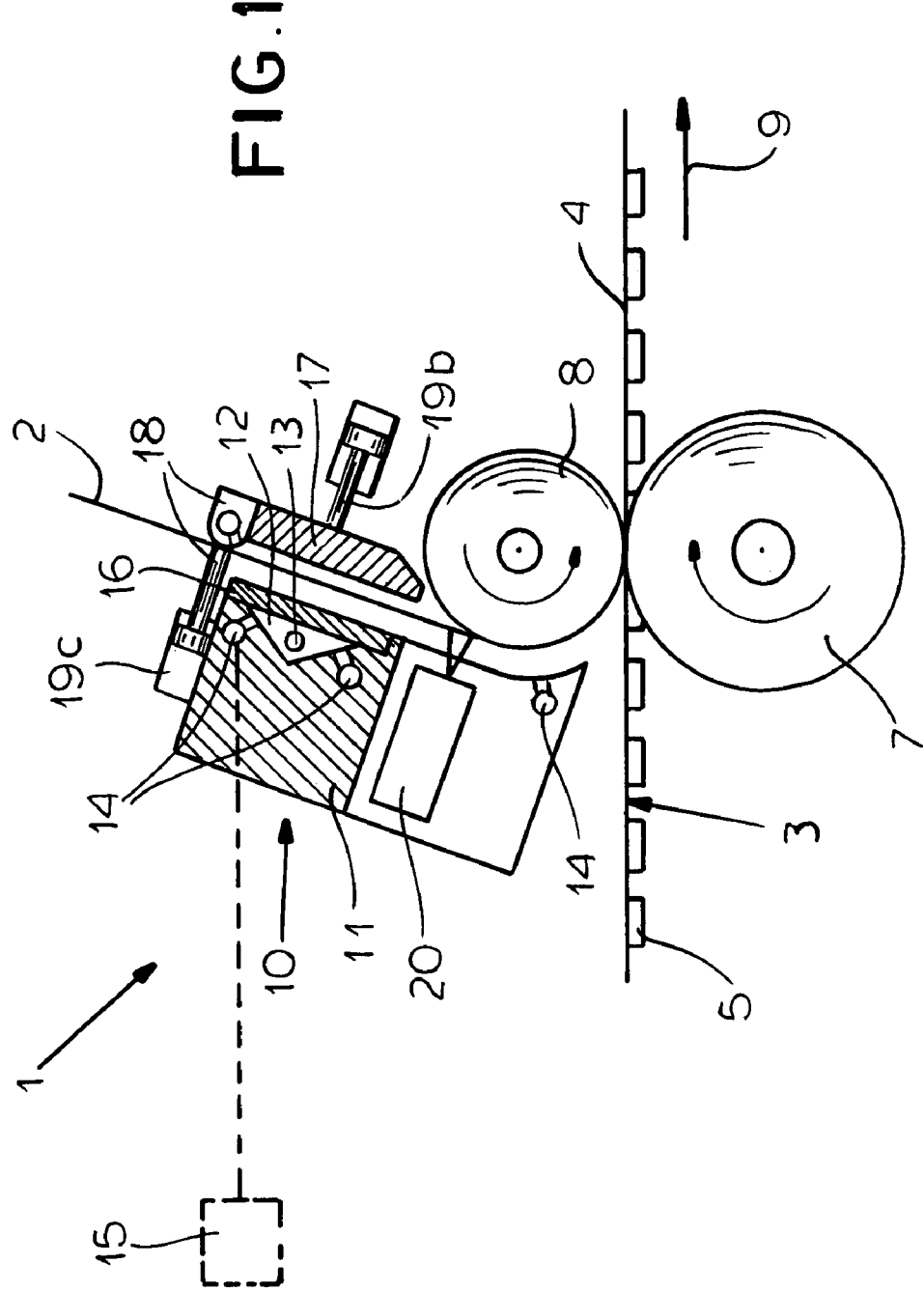
FIG. 1 is a largely schematic side view of the apparatus for carrying out the method of this invention in the shutdown safe mode.

The housing 11 is further provided with a shutter plate 16 that can be moved by an actuator 19a between the FIG. 2 retracted position offset from the chamber 12 and exposing the emitter 13 and the FIG. 1 advanced position covering the chamber 12 and lying between the emitter 13 and the foil 2. This shutter 16 is moved parallel to the tilted plane of movement of the foil 2 at the chamber 12 and is operated by the controller 6.

A flat reflector 17 on the housing 11 is also provided that normally is offset from and parallel to the foil 2 where it passes the chamber 12, and that can be moved by another actuator 19b between this outer position, which is shown in FIGS. 1 and 2, and an inner position lying against the foil 2 and effectively closing the chamber 12. This reflector 17 moves perpendicular to the plane of the foil 2 at the chamber 12 and is also operated by the controller 6. The cooler 21 is also connected to this reflector 17. Thus the cooler 21 keeps the surroundings around the chamber 12 from getting too hot, as the emitter 13 can itself be as hot as about 800° C.

Upstream of the chamber 2 are two clamp elements or bars 18 that can be moved by another actuator 19c between a spaced apart position shown in FIGS. 2 and 3 with the foil 2 passing freely between them and a closed position shown in FIG. 1 gripping and holding the foil 2. These elements 18 serve to hold the foil 2 and prevent it from moving back if it breaks downstream. The controller 6 also operates the actuator 19c.

During normal operation as shown in FIG. 2 the web 3 advances in the direction 9 at a uniform constant speed and the foil 2 advances down between the housing 11 and the reflector 17 at the same speed, out of physical contact with everything except one of the clamp bars 18. The shutter 16 is in the retracted position to expose the chamber 12 and the reflector 17 is also in the outer position spaced from the housing 11 and foil 2. The foil 2 is spaced from the emitter 13 and is moved past it at such a speed that its one face is heated so that, when it is pressed by the roller 7 against the foil 3 running over the cold roller 7, it bonds to the foil 3 at the webs 4 in unitary surface contact.

If, for instance, the drive for the rollers 7 and 8 fails or something happens that prevents the foil 2 from moving fast enough past the emitter 13, vapors will be generated that will be aspirated at 14 and detected by the sensor 15. The controller 6 will then deenergize the emitter 13 to prevent further heating. Contrarily if the sensor 15 detects no vapor outgassing from the foil 2, it will increase voltage to the emitter 13 somewhat until the right level of such vapors is detected.

Under similar conditions if the pyrometer 20 detects that the foil 2 downstream of the chamber 13 is too hot or on fire, it also sends an output to the controller 6 that in turn shuts off the emitter 13. In addition the actuator 19a is operated to move the shutter plate 16 into the advanced or closed position of FIG. 1 and completely block the chamber 12, absolutely preventing further heating of the foil 2.

As redundant safety means, the controller 6 can also advance the reflector 17 to press against and close the chamber 12.

The system can operate at very high speed. Even when the foil 2 is a coated paper sheet, it is possible to delicately heat only the coating on one of the faces, allowing the rollers 7 and 8 to be operated at a relatively low temperature under 200° C. Since the housing 11 can be closed and is cooled, and the roller temperature is minimal, the apparatus 1 can easily and safely be loaded with a new foil 2.

We claim:

1. An apparatus for sealing a cover sheet to a base sheet, the apparatus comprising:
   means including a lower roller over which the base sheet is spanned for advancing the base sheet;
   means including an upper roller for pulling the cover sheet along a path and pressing it against the base sheet at the lower roller;
   a preheater housing along the path upstream of the rollers formed with a chamber open toward the path and the cover sheet extending along the path;
   a radiant heater in the chamber directed therefrom transversely at the path, whereby the heater heats the cover sheet passing along the path;
   sensor means along the path adjacent the chamber for detecting atmosphere in and around the chamber and for generating an output when the detected atmosphere indicates an unsafe hot condition of the cover sheet;
   a shutter shiftable between a retracted position offset from the chamber and an advanced position closing the chamber; and
   control means connected to the sensor means for shifting the shutter from the retracted position to the advanced position when the output is generated by the sensor means.

2. The sealing apparatus defined in claim 1 wherein the heater is electromagnetic.

3. The sealing apparatus defined in claim 2 wherein the heater is an NIR heater.

4. The sealing apparatus defined in claim 1 wherein the shutter lies between the housing and the path.

5. The sealing apparatus defined in claim 4 wherein the shutter is a plate.

6. The sealing apparatus defined in claim 5 wherein the shutter moves parallel to the path between its positions.

7. The sealing apparatus defined in claim 1, further comprising
   a reflector spaced transversely of the path from the housing at the chamber, the path extending between the reflector and the housing.

8. The sealing apparatus defined in claim 7, further comprising
   means for displacing the reflector transversely of the path between an outer position spaced from the housing and from the cover sheet on the path and an inner position against the housing and closing the chamber.

9. The sealing apparatus defined in claim 7, further comprising
   means for cooling the reflector.

10. The sealing apparatus defined in claim 1 wherein the housing and path form an acute angle with vertical, the chamber being directed downward from the horizontal toward the cover sheet.

11. The sealing apparatus defined in claim 10 wherein the angle is between 15° and 45°.

12. The sealing apparatus defined in claim 1, further comprising
    means upstream along the path from the chamber for gripping the cover sheet.

13. The sealing apparatus defined in claim 1 wherein the housing is formed adjacent the chamber with intake passages connected to the sensor means.

14. The sealing apparatus defined in claim 13, further comprising
    means for drawing air in through the passages and feeding it to the sensor means.

15. The sealing apparatus defined in claim 1, further comprising
    means including a pyrometer downstream along the path from the chamber; and
    control means connected to the pyrometer, to the sensor means, and to the radiant heater for controlling the temperature of the heater.

16. The sealing apparatus defined in claim 1, further comprising
    means for cooling the housing.

17. The sealing apparatus defined in claim 1, further comprising
    means for cooling the lower roller.

18. The sealing apparatus defined in claim 1, further comprising
    means for heating the upper roller.

* * * * *